United States Patent [19]

Schmid et al.

[11] 4,087,918
[45] May 9, 1978

[54] APPARATUS FOR MEASURING THE GEOMETRY OF THE HOLLOW MOLD COMPARTMENT OF CONTINUOUS CASTING MOLDS

[75] Inventors: Markus Schmid, Zurich; Adolf Fuchs, Wadenswil, both of Switzerland

[73] Assignee: Concast AG, Zurich, Switzerland

[21] Appl. No.: 707,204

[22] Filed: Jul. 21, 1976

[30] Foreign Application Priority Data

Jul. 28, 1975 Switzerland .................. 9800/75

[51] Int. Cl.² ........................................ G01B 7/28
[52] U.S. Cl. ................... 33/174 P; 33/143 L; 33/174 Q; 33/178 E
[58] Field of Search ........... 33/174 P, 174 PA, 143 L, 33/147 K, 174 Q, 178 E, 178 F

[56] References Cited

U.S. PATENT DOCUMENTS

| 2,239,981 | 4/1941 | Terry et al. ............... 33/178 E |
| 3,315,367 | 4/1967 | Walsh et al. .............. 33/178 E |

FOREIGN PATENT DOCUMENTS 884,111   7/1949   Germany .................. 33/178 E
750,934   5/1943   Germany .................. 33/178 E

*Primary Examiner*—Richard E. Aegerter
*Assistant Examiner*—Willis Little
*Attorney, Agent, or Firm*—Werner W. Kleeman

[57] ABSTRACT

An apparatus for measuring the geometry of the hollow mold compartment of continuous casting molds comprising a measuring head displaceable essentially in the direction of its lengthwise axis and having three impact or contact elements arranged at a first side of the measuring head. The impact elements form a triangle which is parallel to the lengthwise axis of the measuring head. A first measuring feeler is arranged at this first side so as to bear against the neighboring mold wall and is perpendicular to the plane of the triangle and at least one resilient impact element is arranged at a second side of the measuring head opposite the first side and produces a force-vector directed away from the triangle at a right angle. A second measuring feeler is arranged at the second side of the measuring head coaxial to the first measuring feeler and bears against the opposite wall of the hollow mold compartment. Indicator elements operatively connected with the measuring feelers indicate the position thereof.

10 Claims, 6 Drawing Figures

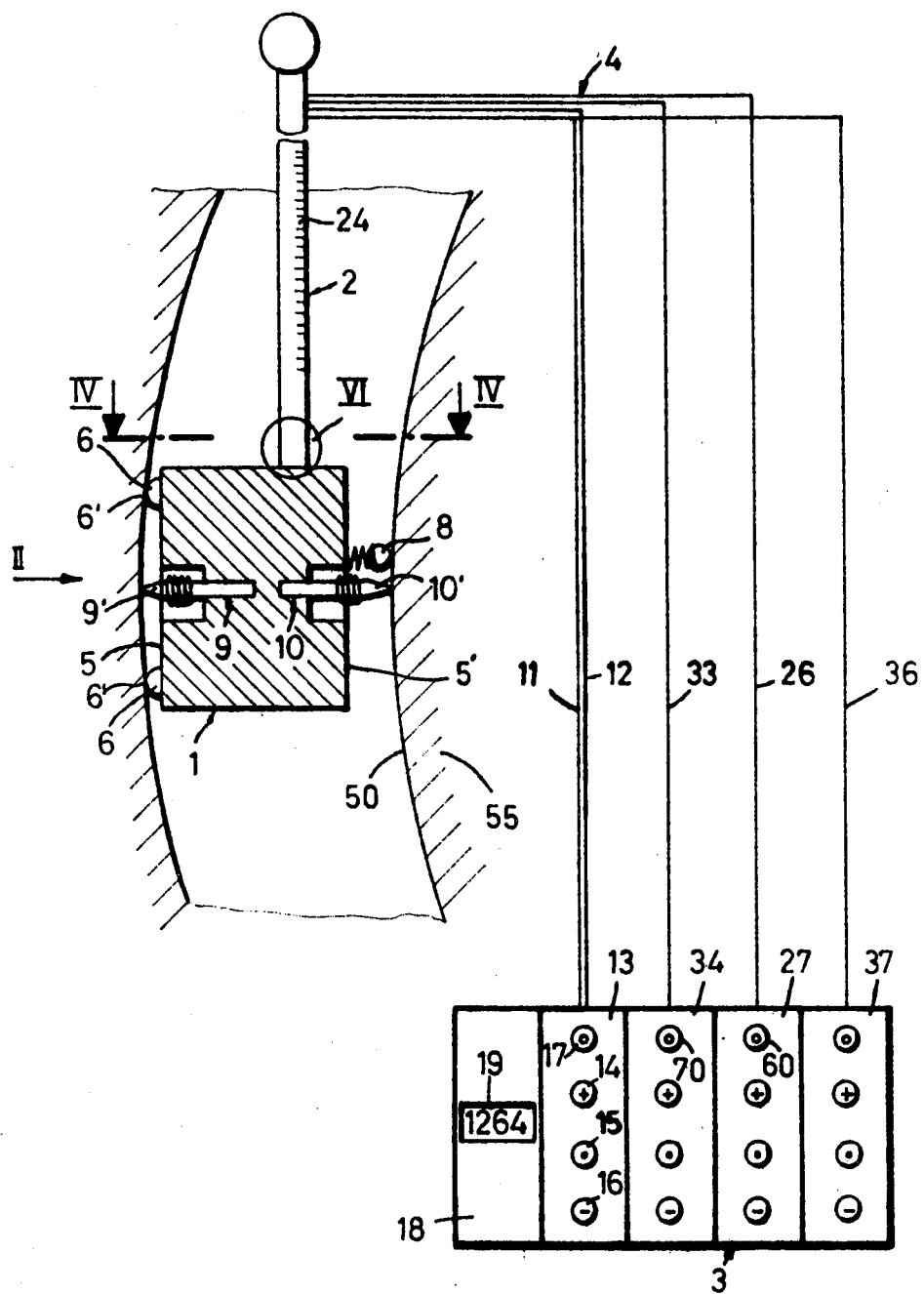

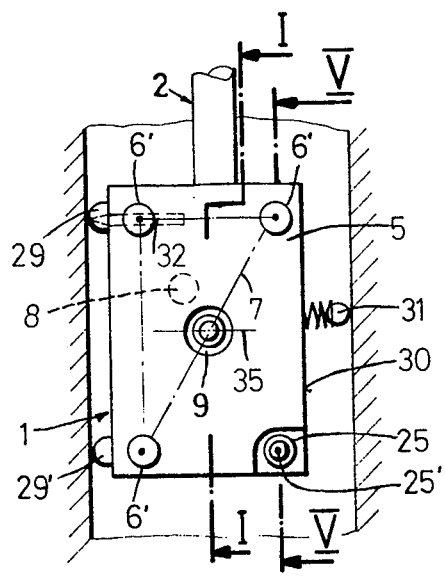
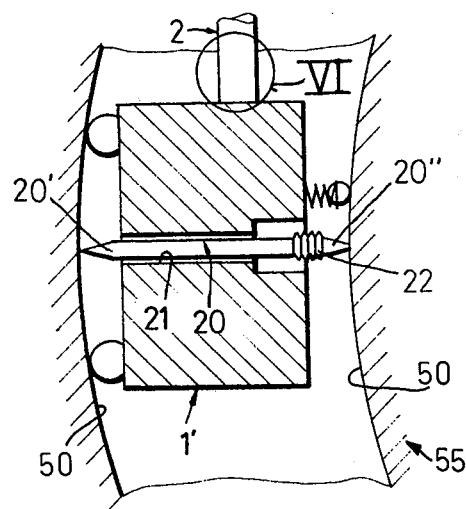
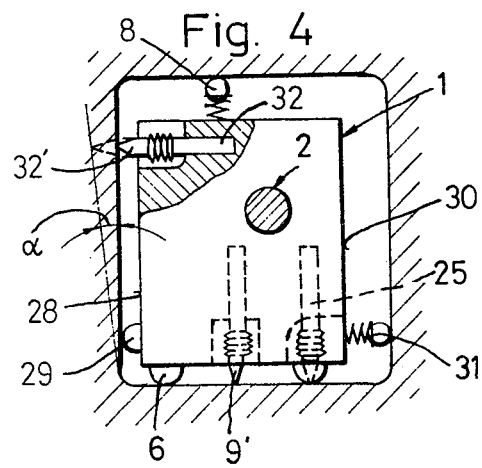
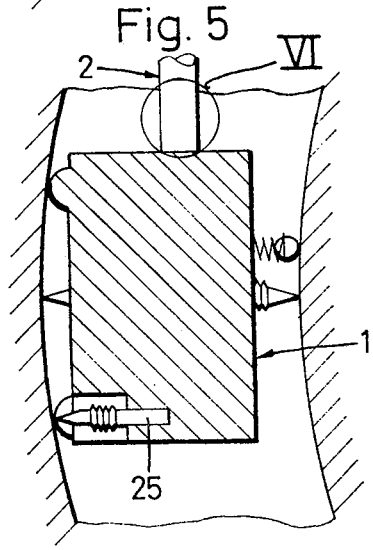
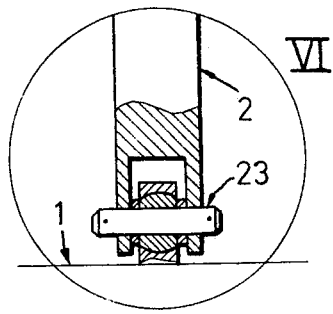

APPARATUS FOR MEASURING THE GEOMETRY OF THE HOLLOW MOLD COMPARTMENT OF CONTINUOUS CASTING MOLDS

BACKGROUND OF THE INVENTION

The present invention relates to a new and improved construction of apparatus for measuring the geometry of the hollow mold compartment of continuous casting molds.

The geometry of a hollow mold compartment of a continuous casting mold, especially its inner width, presently is measured upon a leveling plate with the aid of known measurement instruments, such as micrometers, dial gauges, bow spacers and so forth. Such manual measurement operations require a great deal of time in order to merely obtain the exact size of the inner width of a mold at a few points distributed over the length of the mold. Yet such individual measurements give very little information regarding the exact geometric configuration of the hollow mold compartment. If the walls have been warped or slightly twisted about the lengthwise axis of the hollow mold compartment, something which especially happens in the case of tubular molds, then such measurements of the inner width of the mold with the aforementioned instruments are not very conclusive for the determination of the geometry of the hollow mold compartment, and hence, the quality of the mold.

Additionally difficulties arise during the measurement and evaluation of arc-shaped hollow mold compartments. Such mold compartments possess two oppositely situated parallel or converging planar walls and two oppositely situated parallel or converging arcuate walls. Even small dimensional deviations of the prescribed inner width together with warping and twisting of the mold walls from the ideal geometry of the hollow mold compartment can appreciably impair the quality of the strand produced therewith and can lead to metal breakouts.

SUMMARY OF THE INVENTION

Hence, it is a primary object of the present invention to provide an improved apparatus for measuring the geometry of the hollow mold compartment or cavity of a continuous casting mold in an extremely simple, reliable and accurate manner.

Another and more specific object of the present invention aims at the provision of an apparatus for the exact measurement of the geometry of the hollow mold compartment of continuous casting molds, by means of which there can be measured both the mutual spacing between oppositely situated planar walls of the hollow mold compartment as well as also between oppositely situated curved walls of the hollow mold compartment and/or there can be determined warping or other misconfiguration of the mold compartment walls.

Now in order to implement these and still further objects of the invention, which will become more readily apparent as the description proceeds, there is provided a measuring head which can be displaced in the direction of its lengthwise axis and having three impact or contact elements arranged at a first side of the measuring head. These three impact elements form a triangle parallel to the lengthwise axis of the measuring head. A first measuring feeler is arranged at this first side perpendicular to the plane of the triangle. At least one resilient impact or contact element is arranged at the oppositely situated second side of the measuring head, this resilient impact element producing a force vector directed at right angles away from the triangle. A second measuring feeler is arranged at the second side of the measuring head coaxial to the first measuring feeler and bears against the opposite wall of the hollow mold compartment. Also there are provided indicator elements which are operatively connected with the measuring feelers in order to indicate their position.

With the apparatus of the invention it is possible to determine the mold geometry both with respect to the inner width and also with respect to irregularities and warping of the mold walls along a desired measurement line extending in the direction of travel of the strand. A rapid and exact quality determination of both new molds as well as also used molds in the installed condition is thus possible.

Apart from measuring the inner width of the hollow mold compartment and warping of the mold walls, the measurement of the rhomboidness or diamond-like shape of tubular molds constitutes an additional aspect for the determination of the quality of the mold. Hence, according to a further feature of the invention the diamond-like shape can be measured in that two of the contact or impact points determining the triangle are arranged in a plane located transversely with respect to the lengthwise axis of the measuring head and at a third side of the measuring head which is disposed at an angle of 90° with respect to the first side there is arranged an impact or contact element approximately in the same plane and at a spacing from the triangular surface defined by the three contact or impact points as well as a further impact or contact element on a line extending parallel to the measuring head-lengthwise axis and through the impact element at such third side and at the height of the lower impact element of the triangular surface. A third feeler is arranged at the third side at a greater spacing from the triangular surface and is operatively connected with a further indicator element. At the fourth side of the measuring head, opposite the third side, there is provided a resilient impact or contact element.

A simplification of the measuring head can be advantageously realized if, instead of the first measuring feeler and the second measuring feeler, there is floatingly arranged a single measuring feeler in the measuring head. The floatingly arranged or floating feeler, with this arrangement, is exclusively employed for measuring the inner width and a further feeler can be mounted for measuring the distortion or warping of the wall. The arrangement of this further measuring feeler is undertaken, according to a further aspect of the invention, such that the impact or contact points form a right-angle triangle with a leg parallel to the lengthwise axis of the measuring head, that at the first side of the measuring head there is provided a further measuring feeler arranged parallel to the first measuring feeler, this further measuring feeler together with the three impact points forming a rectangle. Additionally, the further measuring feeler is operatively connected with a further indicator element which indicates the relative position of the measuring feeler tip to the plane of the triangle.

If the arc radius also is to be determined in the case of arc-shaped molds, then the invention contemplates that the impact or contact points form a right-angle triangle with a leg parallel to the lengthwise axis of the measuring head and that the median perpendicular of such leg intersects the lengthwise axis of the first and/or an additional measuring feeler and that indicator elements indicate the position of the first and/or the additional measuring feeler tips with respect to the surface of the triangle.

In order to be able to detect every magnitude deviation which has been indicated by the corresponding classification unit and in order to be able to measure conical molds, the walls of which uniformly or irregularly converge in the direction of travel of the strand, it is conceivable for the indicator elements to possess devices for a digital read-out and/or for a classification or grading indication.

The position of the measuring head within the mold is easily determinable if such is secured at a handle provided with a scale. This handle is advantageously connected by a Cardan or universal joint with the measuring head.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a vertical sectional view, taken along the line I — I of FIG. 2, through a measuring head in an arc-shaped tubular mold together with electronic indicator elements;

FIG. 2 is a view looking in the direction of the arrow II of FIG. 1;

FIG. 3 is a vertical sectional view of a second exemplary embodiment of a measuring head;

FIG. 4 is a cross-sectional view taken along the line IV — IV of FIG. 1;

FIG. 5 is a cross-sectional view taken along the line V — V of FIG. 2; and

FIG. 6 is a detail showing of the location VI of FIGS. 1, 3 and 5 respectively.

DETAILED DESCRIPTION OF THE INVENTION

Referring now to the drawings, the first exemplary embodiment illustrated in FIGS. 1, 2, 4, 5 and 6 will be seen to essentially comprise a measuring head 1 arranged at a handle 2 or equivalent structure and indicator elements 3 which are connected by electrical conductors or lines 4 with measuring feelers mounted in the measuring head 1, as will be fully explained shortly. The conductors 4 are guided within the handle or rod 2 up to the location of the measuring head 1. This measuring head 1 is provided at a first side 5 with three impact or contact elements 6 each of which define an impact or bearing point 6'. These impact points 6' in turn form a right-angle triangle 7 (shown in FIG. 2 in phantom lines), and two of the impact points 6' are located in a plane oriented transversely with respect to the lengthwise axis of the measuring head 1. At a second side 5' of the measuring head 1 located opposite the first side 5 there is arranged a resilient impact or contact element 8 which bears against the wall 50 of the mold 55 and produces a force vector which is directed at a right angle away from the triangle 7. The resilient impact or contact element 8 thus urges the three impact or contact points 6' against the mold wall 50, cooperating with the first side 5 of the measuring head 1.

Now at right angles to the plane of the triangle 7 there are supported in the measuring head 1 a first measuring feeler 9 and a second measuring feeler 10 which are coaxially aligned with respect to one another. Each of these measuring feelers 9 and 10 is equipped with a resilient tip 9' and 10' respectively, which in each case is always in physical contact with the associated mold wall. Both of the measuring feelers 9 and 10 are connected by means of two conductors 11 and 12 with an indicator element 13 which constitutes a classification or grading unit. The classification unit 13 possesses for example a red lamp 14, a green lamp 15 and a yellow lamp 16. If the inner width of the mold as determined by the measuring feelers 9 and 10 falls within a predetermined tolerance range set at the classification unit 13, then the green lamp 15 illuminates. If the inner width exceeds this tolerance range then the red lamp 14 illuminates, and upon falling below such tolerance range the yellow lamp 16 illuminates. The classification unit 13 is connected with a digital display or indicator 18. By actuating a selector or reversing switch 17, for instance in the form of a contact pin, the conductors 11 and 12 can be directly connected with the digital indicator 18, so that the deviations of the inner width from a reference value as determined by the measuring feelers 9 and 10 can be displayed at a counter window 19.

FIG. 3 illustrates a second exemplary embodiment wherein both of the measuring feelers 9 and 10 are replaced by a floating measuring feeler 20 having the measuring feeler tips 20' and 20" which are resilient in the axial direction relative to one another. The entire measuring feeler 20 is mounted to be axially displaceable in a bore 21 within the measuring head 1'. A spring 22 retains both of the measuring feeler tips 20' and 20" in physical contact with the associated mold walls 50.

The handle 2 is connected by means of a Cardan or universal joint 23 or equivalent structure with the corresponding measuring head 1 or 1', as best seen by referring to FIG. 6. In this way it is possible to measure arc- or arcuate-shaped molds over their entire length. The handle 2 possesses a scale 24 which is for instance graduated in millimeters, and thus it can be readily determined at what elevational position of the mold 55 there is being measured the inner width.

As seen from the illustration of FIGS. 2, 4 and 5 a further measuring feeler 25 is arranged in the measuring head 1 at the first side 5 of such measuring head 1. Its tip 25' forms, viewed in the direction of the arrow II of FIG. 1, together with the three impact or contact points 6' a rectangle (FIG. 2). The measuring feeler 25 is connected by means of a conductor 26 with a second indicator element 27 which, like the indicator element 13, is constructed as a classification unit or device and optically indicates the relative position of the measuring feeler tip 25' from the plane of the triangle 7 when there are present irregularities in the mold wall. If the deviation exceeds a set tolerance range, then when exceeding such range the red lamp illuminates, upon falling below such range the yellow lamp illuminates and within the tolerance range the green lamp illuminates. The deviation from the reference value likewise can be numerically displayed, by actuating a reversing switch 60, in the numerical display window or zone 19 of the digital indicator 18. If the second indicator element 27 indicates a constant deviation when the measuring head 1 travels through the tubular mold, then such means that the tubular mold has been improperly bored about its lengthwise axis since as a result thereof the mold walls dome inwardly in a convex fashion.

At a third side 28 of the measuring head 1 offset through 90° about the lengthwise axis of the measuring head 1 there are arranged at a spacing from the triangular surface defined by the three impact or contact points 6', and which spacing should be as small as possible, two impact or contact elements 29 and 29'. The impact element 29 is located approximately in the plane disposed transverse to the lengthwise axis of the measuring head and which is formed by both of the upper impact or contact elements 6'. The further impact or contact element 29' is arranged on a line which is parallel to the measuring head-lengthwise axis and extending through the impact element 29 at the height of the lower impact element 6'. At the opposite fourth side 30 of the measuring head 1 there is provided a resilient impact or contact element 31 which bears against the associated mold wall 50 and thus holds the contact element 29 in physical contact with its neighboring mold wall. At the side 28 there is furthermore mounted a measuring feeler 32 approximately at the height of the plane located transverse to the measuring head. The spacing of the measuring feeler 32 from the surface of the triangle 7 is greater than the spacing of the impact element 29 from such surface. This measuring feeler 32 has a measuring feeler tip 32'.

The measuring head 1 is applied, on the one hand, by the action of the resilient contact element 8 with the impact or contact elements 6 of the triangle 7 against one of the four mold walls 50, whereas, on the other hand, the resilient impact or contact element 31 places such measuring head at a neighboring mold wall until it bears thereagainst by means of the impact or contact elements 29, 29'. Now if the angle α between both of these bounding mold walls, as indicated by the broken lines in FIG. 4, deviates from 90°, then the resilient measuring feeler tip 32' shifts in accordance with the course of the mold wall. In so doing the deviation of the measuring feeler tip 32' from a reference value, which corresponds to an angle α of the mold wall of 90°, can be positive or negative depending upon whether the angle α is greater or smaller than 90°. The deviation thus indicates that the tubular mold possesses a diamond-like or rhomboid misconfiguration. The measuring feeler 32 is connected by means of a conductor or line 33 with the third indicator element 34 which, like the other indicator elements 13 and 27, is constructed as a classification unit or device and optically indicates too great deviations from such reference value. Also from this classification unit 34 it is possible, by actuating a reversing switch 70, to visibly display the position of the measuring feeler 32 in the numerical display field 19 of the digital indicator 18.

As will be seen from FIGS. 1 and 2 two of the three impact or contact points 6' are arranged along a line which is parallel to the displacement axis, and which line forms one of both legs of the triangle 7. The measuring feeler 9 is located at the median perpendicular 35 of such triangle leg. This triangle leg, in the case of a curved tubular mold, corresponds to the chord between both of the bounding impact points 6'. Consequently, the measuring feeler 9 also can measure the arc height over the given chord length. This arc height, for a predetermined radius of curvature of the tubular mold, corresponds to a constant value. The measuring feeler 9 is connected by means of a conductor or line 36 with a fourth indicator element or device 37 for checking the radius of curvature, this indictor element likewise constitutes a classification unit. Like the other classification units, such also optically indicates by means of lamps whether the radius of curvature is within a permissible tolerance range, above such or below such. In order to determine the radius there can be provided, apart from the measuring feeler 9 at the median perpendicular 35, a not particularly illustrated additional measuring feeler which is connected by the conductor 36 with the indicator element 37.

According to a simple constructional manifestation of the invention the measuring head contains, apart from the impact or contact elements 6 and the resilient impact or contact element 8, only both of the measuring feelers 9 and 10, the lines or conductors 11, 12 and 26 as well as the classification units or devices 13 and 27, so that the mold inner width as well as possible irregularities of the mold wall can be determined. With this embodiment it is possible to determine in the case of arc-shaped or arcuate molds also the radius if the measuring feeler 9 is arranged at the median perpendicular 35 and there is provided therefor a suitable classification unit.

In order to reduce the working time needed for preparing a measurement report, the indicator element 13 can be provided with a suitable recording device.

While there are shown and described present preferred embodiments of the invention, it is to be distinctly understood that the invention is not limited thereto, but may be otherwise variously embodied and practiced within the scope of the following claims. Accordingly,

What we claim is:

1. An apparatus for measuring the geometry of a hollow arc-shaped mold compartment of a continuous casting mold, said mold compartment having a polygonal cross-section including at least four corners, comprising a measuring head having a lengthwise axis and displaceable essentially in the direction of said lengthwise axis, three impact elements arranged at a first side of the measuring head, said three impact elements forming a triangle which is essentially parallel to the lengthwise axis of the measuring head, a first measuring feeler arranged at the first side of the measuring head and extending in a direction which is substantially perpendicular to the plane of the triangle, said first measuring feeler serving to bear against a neighboring wall of the hollow mold compartment of the mold, at least one resilient impact element arranged at a second side of the measuring head opposite the first side, said resilient impact element producing a force vector directed away essentially at right angles from the triangle, a second measuring feeler arranged substantially coaxially with respect to the first measuring feeler at the second side of the measuring head, the second measuring feeler serving to bear against the wall of the hollow mold compartment of the mold opposite said neighboring wall, at least one indicator element operatively connected with the measuring feelers in order to indicate the position thereof, said three impact elements defining three impact points which contact said neighboring wall of the hollow mold compartment of the continuous casting mold and form a triangle surface of said triangle, two of said impact points being arranged in a plane disposed substantially transversely with respect to the lengthwise axis of the measuring head, said measuring head having a third side which merges with the first side at an angle of approximately 90°, a first impact element arranged at the third side in said plane and in spaced relationship from the triangle surface defined by the three impact points, a second impact element disposed at the third side along a line extending substantially parallel to the lengthwise axis of the measuring head and through the first impact element, one of said three impact elements of said triangle defining a lower impact element, said second impact element being located substantially at the height of said one lower impact element of said triangle, a third measuring feeler arranged at the third side at a greater spacing from the triangle, a further indicator element operatively connected with the third measuring feeler, and a resilient impact element provided at a fourth side of the measuring head which is opposite the third side.

2. The apparatus as defind in claim 1, wherein a single measuring feeler is provided in a floating arrangement in the measuring head instead of the first and the second measuring feelers.

3. The apparatus as defined in claim 1, wherein the impact points form a right-angle triangle having a leg essentially parallel to the lengthwise axis of the measuring head, a further measuring feeler having a tip provided at the first side of the measuring head substantially parallel to the first measuring feeler, the further measuring feeler together with the impact points form a rectangle, and a further indicator element operatively connected with the further measuring feeler which indicates the relative position of the measuring feeler tip to the plane of the triangle.

4. The apparatus as defined in claim 3, wherein the impact points form a right-angle triangle with a leg substantially parallel to the lengthwise axis of the measuring head, and a median perpendicular to such leg intersects the lengthwise axis of the first measuring feeler.

5. The apparatus as defined in claim 3, further including an additional measuring feeler having a tip, the impact points form a right-angle triangle with a leg substantially parallel to the lengthwise axis of the measuring head, a median perpendicular to such leg intersecting the lengthwise axis of said additional measuring feeler, and indicator means for indicating the position of the additional measuring feeler tip with respect to the surface of the triangle.

6. The apparatus as defined in claim 1, wherein the indicator element comprises means for digital indication.

7. The apparatus as defined in claim 1, wherein the indicator element comprises means for classification indication.

8. The apparatus as defined in claim 1, further including a handle provided with a scale at which there is secured the measuring head.

9. The apparatus as defined in claim 1, further including a handle, a Cardan joint for connecting the measuring head with the handle.

10. An apparatus for measuring the geometry of a hollow arc-shaped mold compartment of a continuous casting mold, said mold compartment having a polygonal cross-section including at least four corners, comprising a measuring head having a lengthwise axis and displaceable essentially in the direction of said lengthwise axis, three impact elements arranged at a first side of the measuring head, said three impact elements forming a triangle which is essentially parallel to the lengthwise axis of the measuring head, measuring feeler means serving to bear against opposed walls of the hollow mold compartment of the mold, at least one resilient impact element arranged at a second side of the measuring head opposite the first side, said resilient impact element producing a force vector directed away essentially at right angles from the triangle, at least one indicator element operatively connected with the measuring feeler means in order to indicate the position thereof, said three impact elements defining three impact points which contact said neighboring wall of the hollow mold compartment of the continuous casting mold and form a triangle surface of said triangle, two of said impact points being arranged in a plane disposed substantially transversely with respect to the lengthwise axis of the measuring head, said measuring head having a third side which merges with the first side at an angle of approximately 90°, a first impact element arranged at the third side in said plane and in spaced relationship from the triangle surface defined by the three impact points, a second impact element disposed at the third side along a line extending substantially parallel to the lengthwise axis of the measuring head and through the first impact element, one of said three impact elements of said triangle defining a lower impact element, said second impact element being located substantially at the height of said one lower impact element of said triangle, a further measuring feeler arranged at the third side at a greater spacing from the triangle, a further indicator element operatively connected with the further measuring feeler, and a resilient impact element provided at a fourth side of the measuring head which is opposite the third side.

* * * * *